United States Patent
Golbandi et al.

(10) Patent No.: US 10,664,484 B2
(45) Date of Patent: May 26, 2020

(54) COMPUTERIZED SYSTEM AND METHOD FOR OPTIMIZING THE DISPLAY OF ELECTRONIC CONTENT CARD INFORMATION WHEN PROVIDING USERS DIGITAL CONTENT

(71) Applicant: OATH INC., New York, NY (US)

(72) Inventors: Nadav Golbandi, Sunnyvale, CA (US); Xing Yi, Milpitas, CA (US); Liangjie Hong, Sunnyvale, CA (US)

(73) Assignee: OATH INC., New York, NY (US)

( * ) Notice: Subject to any disclaimer, the term of this patent is extended or adjusted under 35 U.S.C. 154(b) by 1036 days.

(21) Appl. No.: 15/165,557

(22) Filed: May 26, 2016

(65) Prior Publication Data

US 2017/0344552 A1 Nov. 30, 2017

(51) Int. Cl.
*G06F 16/2457* (2019.01)
*G06F 16/9535* (2019.01)

(52) U.S. Cl.
CPC .... *G06F 16/24578* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 8,468,083 B1* | 6/2013 | Szulczewski | G06Q 30/02 705/36 R |
| 2015/0052121 A1* | 2/2015 | Sharifi | G06F 16/24578 707/723 |
| 2015/0206195 A1* | 7/2015 | Rangarajan | G06Q 30/0275 705/14.66 |

* cited by examiner

*Primary Examiner* — Amresh Singh
(74) *Attorney, Agent, or Firm* — James J. DeCarlo; Greenberg Traurig, LLP

(57) ABSTRACT

Disclosed are systems and methods for improving interactions with and between computers in content generating, searching, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods leverage the display screen sizes of information cards to improve the accuracy and efficiency of displayed search results. The disclosed systems and methods can be implemented in search and recommendation systems for optimally performing a search and displaying the results of the search based on, among other features, the size of the cards providing each search result and the display size of the screen displaying such results.

18 Claims, 9 Drawing Sheets

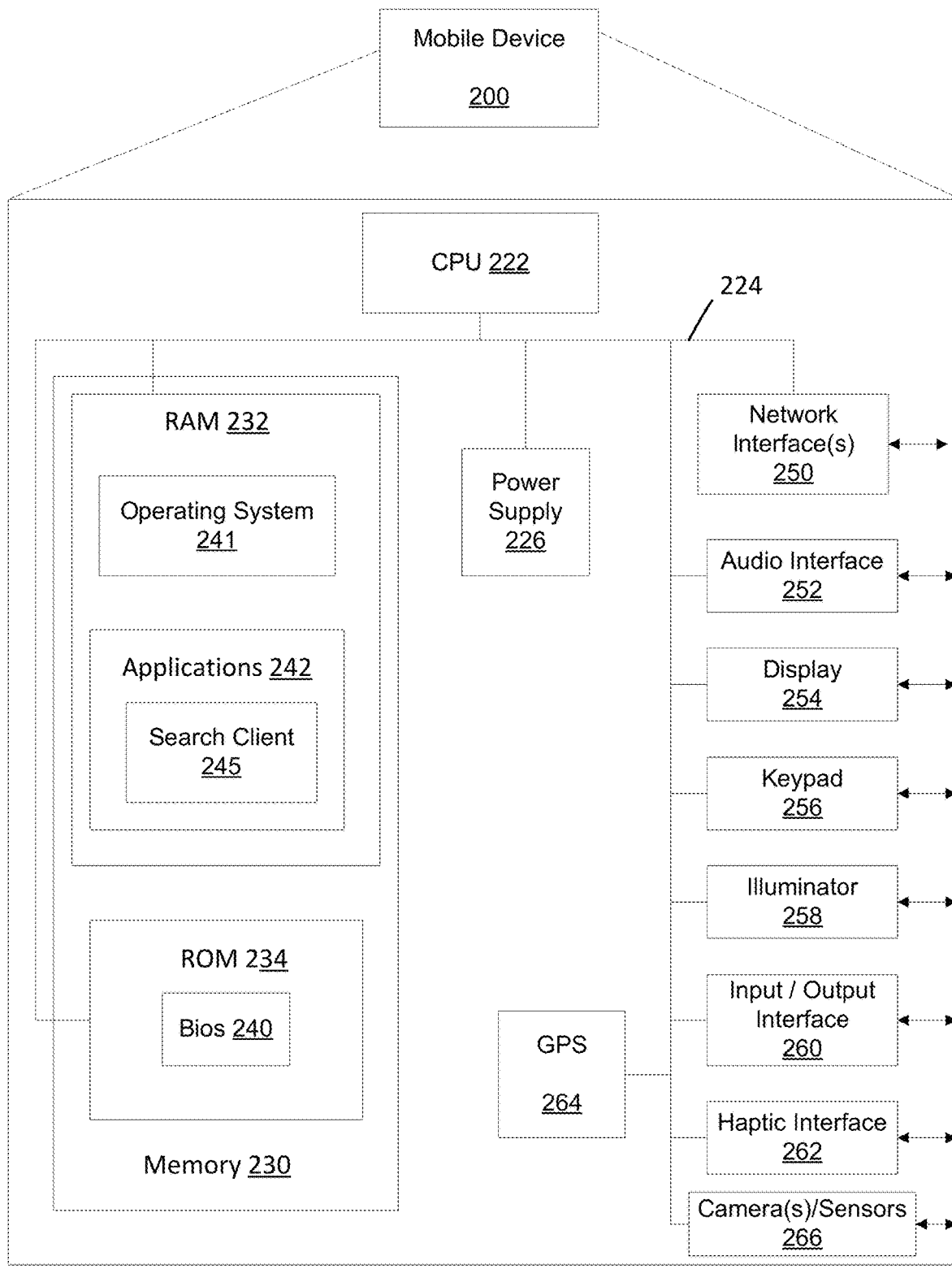

Content information 302
- Friends
- Interests
- News sources
- Location
- Other profile information

↓

Search Result 304
- Local news
- Social network news
- Recommended news
- World News
- Other news content

↑

Third Party sources 306
- Facebook
- Twitter
- Tumblr
- Flickr
- Other 3rd party sources

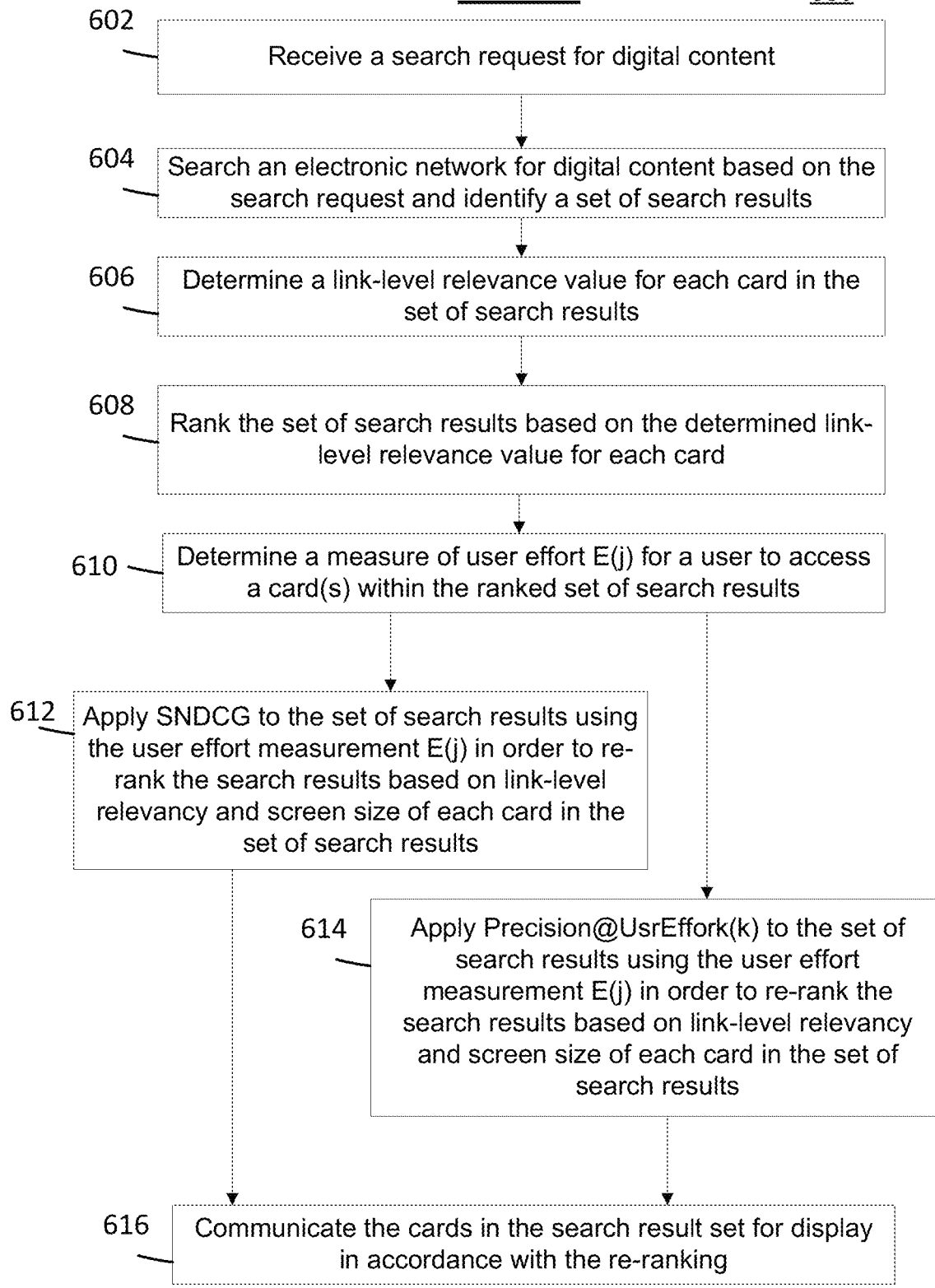

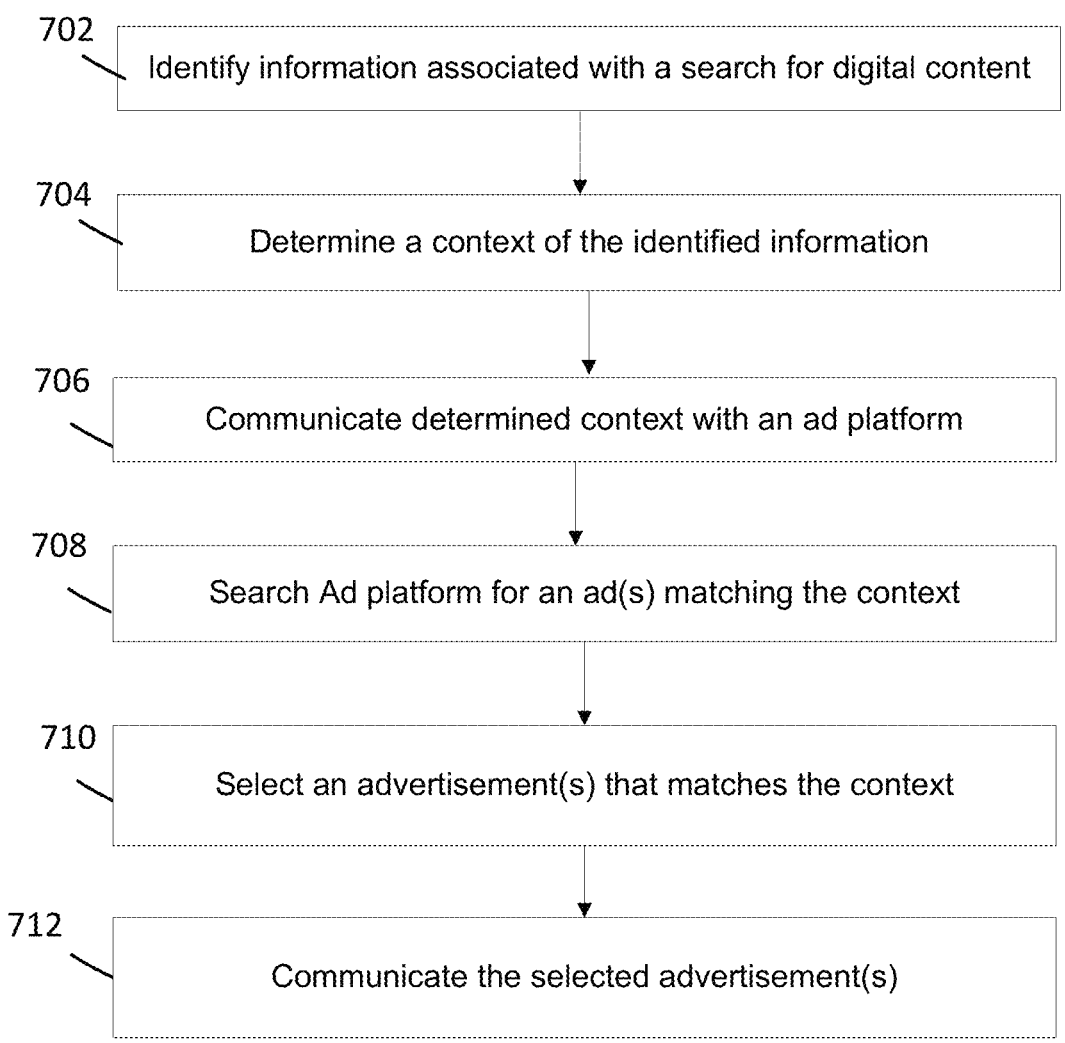

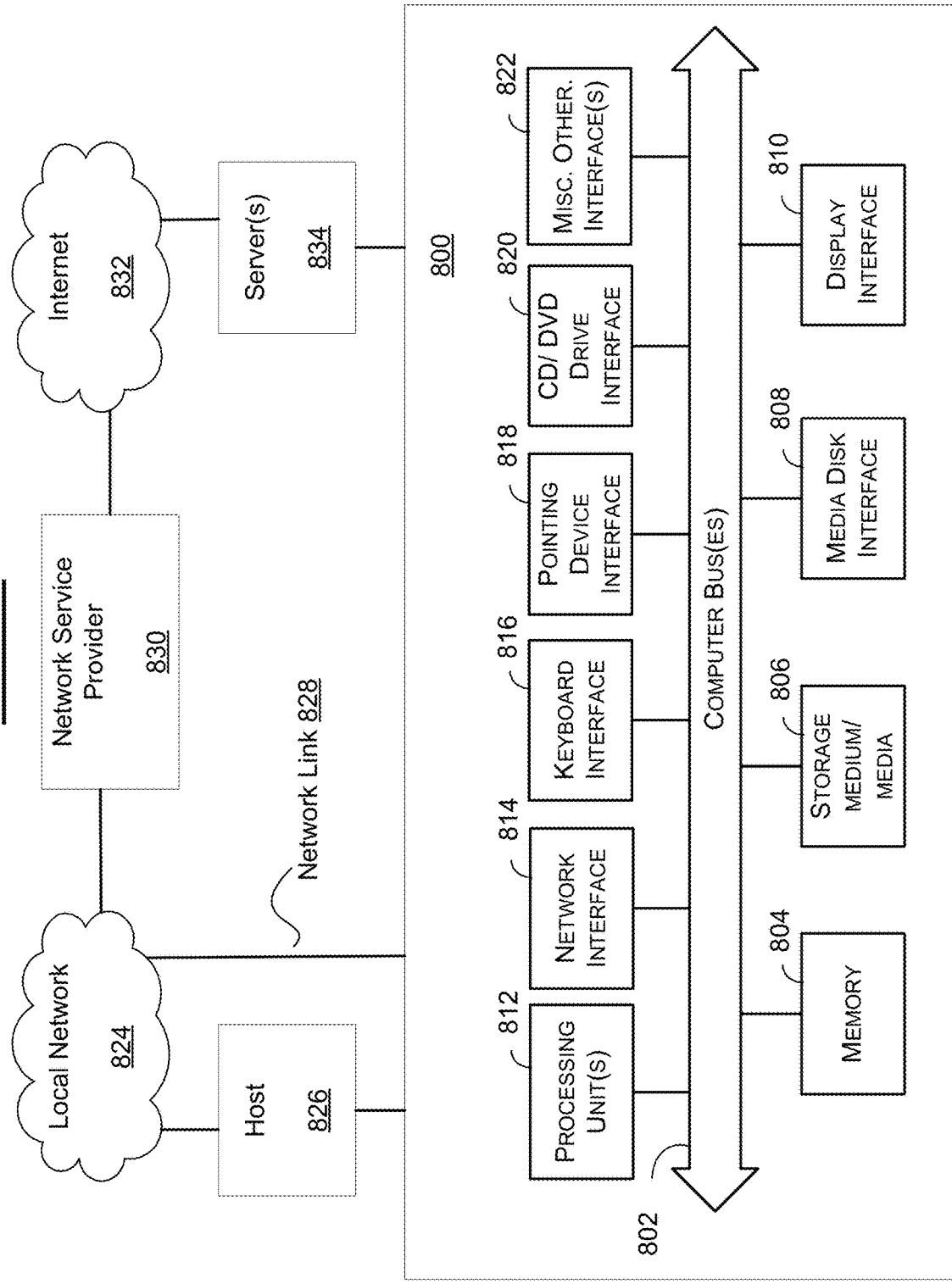

COMPUTERIZED SYSTEM AND METHOD FOR OPTIMIZING THE DISPLAY OF ELECTRONIC CONTENT CARD INFORMATION WHEN PROVIDING USERS DIGITAL CONTENT

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content generating, searching, displaying, providing and/or hosting computer systems and/or platforms by modifying the capabilities and providing non-native functionality to such systems and/or platforms for optimizing user experience and screen real estate utilization by automatically leveraging the display screen sizes of information cards when providing such cards as results within search and recommendation systems.

SUMMARY

The present disclosure provides systems and methods for improving information retrieval through methodologies and frameworks that incorporate the disclosed, novel ranking and optimization targets: SNDCG (which extends NDCG) and Precision@UsrEffort(k) (which extends Precision@k). The disclosed systems and methods provide an automated information retrieval (IR) system that leverages the screen size of displayed information cards, which are identified as a result of a search for content, in order to optimize the results of the IR.

The disclosed systems and methods, which can be advantageously implemented by search or recommendation systems, executes software defining SNDCG and Precision@UsrEffort(k) in order to determine and display requested content optimally on displays of varied screen sizes, thus solving a prevalent problem in presenting content to users of different devices in a manner that promotes optimized visibility and interaction.

As discussed in more detail below, the SNDCG and Precision@UsrEffort(k) algorithms, upon which the screen optimization is based, provide novel and improved mechanisms for performing digital content searches, and communicating and displaying results from such searches that are accurate and displayed in accordance with the attributes of the display of the user's mobile device's display screen.

In accordance with one or more embodiments, a method is disclosed for automatically leveraging the display screen sizes of information cards when providing such cards as a search result within search and recommendation systems. According to some embodiments, inter alia, disclosed methods can be implemented in search and recommendation systems for optimally performing a search and displaying the results of the search based on, among other features, the size of the cards providing each search result and the display size of the screen displaying such results.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically leveraging the display screen sizes of information cards when providing such cards as a search result within search and recommendation systems.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 2 depicts is a schematic diagram illustrating an example of client device in accordance with some embodiments of the present disclosure;

FIGS. 3A-3B provide example embodiments of information cards according to some embodiments of the present disclosure;

FIG. 6 is a flowchart illustrating steps performed in accordance with some embodiments of the present disclosure;

FIG. 7 is a flowchart illustrating steps performed in accordance with some embodiments of the present disclosure; and FIG. 8 is a block diagram illustrating the architecture of an exemplary hardware device in accordance with one or more embodiments of the present disclosure.

DESCRIPTION OF EMBODIMENTS

Figure 1:
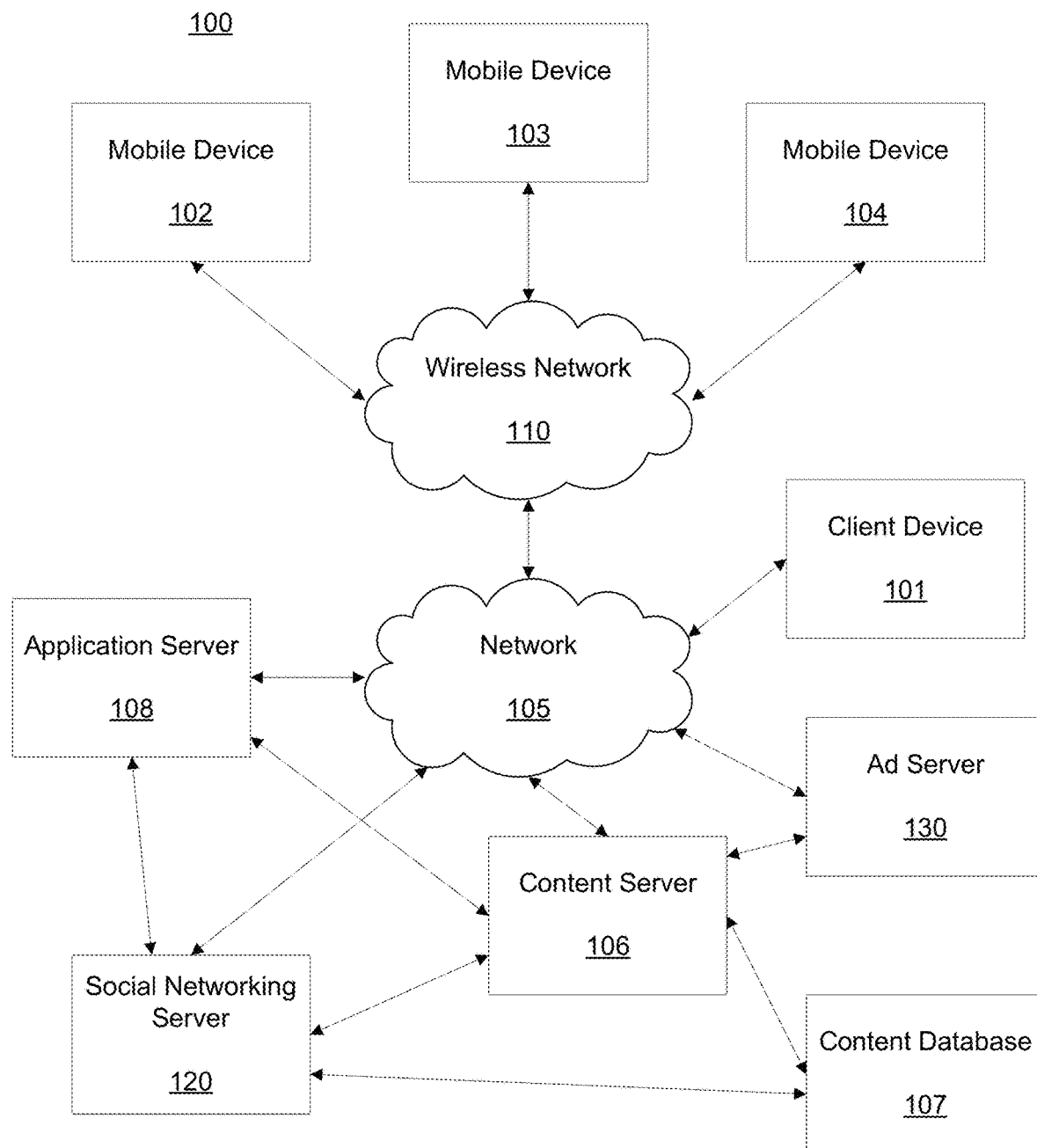
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. The present disclosure provides novel systems and methods for automatically leveraging the display screen sizes of information cards to improve the accuracy and efficiency of search and recommendation systems. According to some embodiments, the disclosed systems and methods can be implemented in search and recommendation systems for optimally performing a search and displaying the results of the search based on, among other features, the size of the cards providing each search result and the display size of the screen displaying such results.

The present disclosure performs the disclosed systems and methods through improved information retrieval methodologies and frameworks that incorporate novel ranking and optimization of search results or targets: SNDCG (which extends NDCG) and Precision@UsrEffort(k) (which extends Precision@k). The disclosed systems and methods provide an automated information retrieval (IR) system that leverages the screen size of displayed information cards, which are identified as a result of a search for content, in order to optimize the results of the IR.

The disclosed systems and methods incorporation of SNDCG is a novel extension of NDCG, which is a normalized discounted cumulative gain technique, methodology and/or algorithm that determines a measure of ranking quality when a search is performed. As understood by those of skill in the art, for example, the premise of discounted cumulative gain (DCG) is that highly relevant documents appearing lower in a search result list should be penalized as the graded relevance value is reduced logarithmically proportional to the position of the result. NDCG extends the DCG methodology by comparing a search's performance (e.g., search engine's performance) from one query to another by determining a cumulative gain for each ranked position. Thus, the NDCG values can be averaged to obtain a measure or quantifiable value of performance of the search engine.

However, a shortcoming, among others, within NDCG is that NDCG is sub-optimal when only partial relevance information is available. Also, conventional NDCG systems do not account for providing results within or on varied screen sizes as such systems only work for vertical designed result pages (e.g., a conventional search result page that lists the results). The improved mechanics of applying SNDCG, as discussed in more detail below, enable search, ranking and recommendation systems to optimally display results regardless of screen size and result display variation.

The disclosed Precision@UsrEffort(k) is a novel extension of Precision@k, which is a computerized algorithm that involves identifying several objects that match a query, and in some embodiments, at different degrees of relevancy. Precision@k takes all retrieved documents into account, and based on a determined cut-off rank, outputs only the top results returned by the system (e.g., returned by the search engine). The disclosed Precision@UsrEffort(k) expands upon this by accounting for determined user effort in identifying desired results. As discussed in more detail below, the determined user effort is based not only on the position of a result in the returned search result, but also how the displayed result is displayed on varied display screens.

The disclosed system and methods implementation of the novel SNDCG and/or Precision@UsrEffort(k) algorithms, as discussed herein, are based on the search results being displayed via "information cards" (also referred to interchangeably as "cards" or "content cards"). As understood by those of skill in the art, an information card is a digital, displayable information object that can be personalized and/or generated based on device information, source information and/or user information. Information cards are individual pieces of content aggregated together for display on a device. Displayed cards on a single display can be from different network sources, and can have different sizes depending on the relevancy to a search and/or available space on a device's display screen. Cards can display any type of digital content, and can be formatted as hyperlinked multi-media content that provides deep-linking features and/or capabilities.

Recently the internet has witnessed a re-architecture of the web away from pages and destinations and towards personalized experiences built on mobile technologies. There are a variety of screen shapes and sizes, and mobile technology has afforded users of mobile devices unprecedented access to data from all kinds of sources through APIs (application program interfaces) and SDKs (software development kits). For example, as illustrated in FIG. 3A, network environment 300 enables a search result 304 to be based on third party sources 306 and/or content information 302.

For example, if a user performs a search for "news," the news search can be based on content from mainstream news sources (e.g., CNN®, and the like), from their friends, the user's interests, the user's location, and the like—shown in FIG. 3A as content information 302. In another example, the search can be respective to information on third party sources 306—for example, from Facebook®, Twitter®, Tumblr®, Flickr®, and the like. The information identified from the search of environment 300 enables the aggregation of content from the content information 302 and/or third party sources 306. A search result can include an information card that includes content derived from a particular source or sources.

As understood by those of skill in the art, as well as current users of mobile systems and applications that display content, the information cards are a form of an information dissemination medium that are capable of manipulation based on the content they are displaying, the device they are being displayed on, the relevancy of the content, and the like, or some combination thereof. Cards can be displayed as vertically stacked information objects on a display screen of a device—e.g., as an activity stream on a phone. Also, cards can be stacked horizontally, where a column can be added to the display upon the device being turned 90 degrees. In some embodiments, cards' display can also be set at a fixed or variable height or width. In some embodiments, cards can be displayed as any shape, orientation, angle, and the like, or some combination thereof, without departing from the scope of the instant application's disclosure.

Figure 3B:
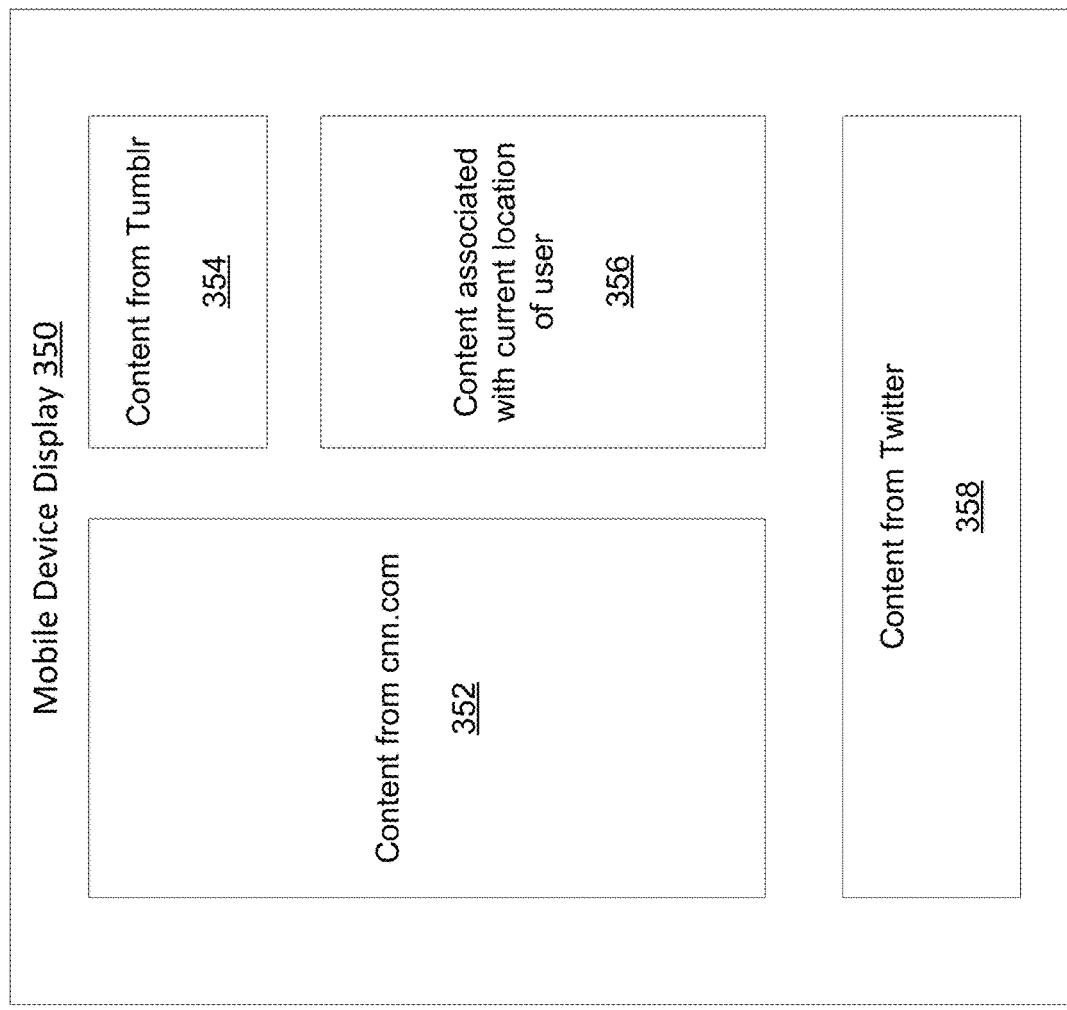

For example, as illustrated in FIG. 3B, a mobile device comprises display screen 350 which displays cards 352-358. Cards 352-358 are displaying content as a result of a search for news content. Card 352 displays interactive content from CNN®. Card 354 displays content from Tumblr®. Card 356 displays content derived in accordance with the user's current location (e.g., content from local news). Card 358 displays content from Twitter®. The content in each card is retrieved, derived, determined or otherwise identified from the source indicated in the card—that is, the content in each card is provided from disparate sources. For example, if the user as requested content about the election, the content in Card 352 would provide an interactive content element(s) that enables the user to view the story (or stories) on CNN about the election. Similarly, Card 356 could provide current events about the current polling going on in the user's state. In some embodiments, the cards can provide aggregated content such that a card has content from differing sources.

As discussed in more detail below, the ordering of the cards can be based on the relevancy of the content, the identity of the source, the size of the card and how it is to be displayed on the user's device, and the like. For example, while the content in Card 352 (e.g., CNN card) may not be the most relevant, since it is the biggest card in the result, it is displayed in a prominent section of the display 350. In another example, the content from Tumblr may not be the most relevant; however, since it is a small card and easily scrolled over due to its small size relative to the other cards and the display screen, it can be placed atop the listing.

As discussed below, the determination of cards, ranking and placement on a display screen of a device (or page displayed on a device's screen) is based on the applied systems and methods when performing a search. The systems and methods utilized herein optimize the screen size of the cards via the SNDCG and Precision@UsrEffort(k) processes, as discussed in more detail below in FIGS. 4-6.

As discussed in more detail below at least in relation to FIG. 7, according to some embodiments, information associated with, utilized in searching for, communicating and/or displaying search results (e.g., identified and displayed information cards of content), as discussed herein, can be used for monetization purposes and targeted advertising when displaying the information cards on a user's device. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, social networking server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site(s). A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service, a gaming site, an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, game servers, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a search or news application, photo-sharing/storage application, a streaming video application, blog, or gaming application, can be hosted by the application server 108 (or content server 106, social networking server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 4:
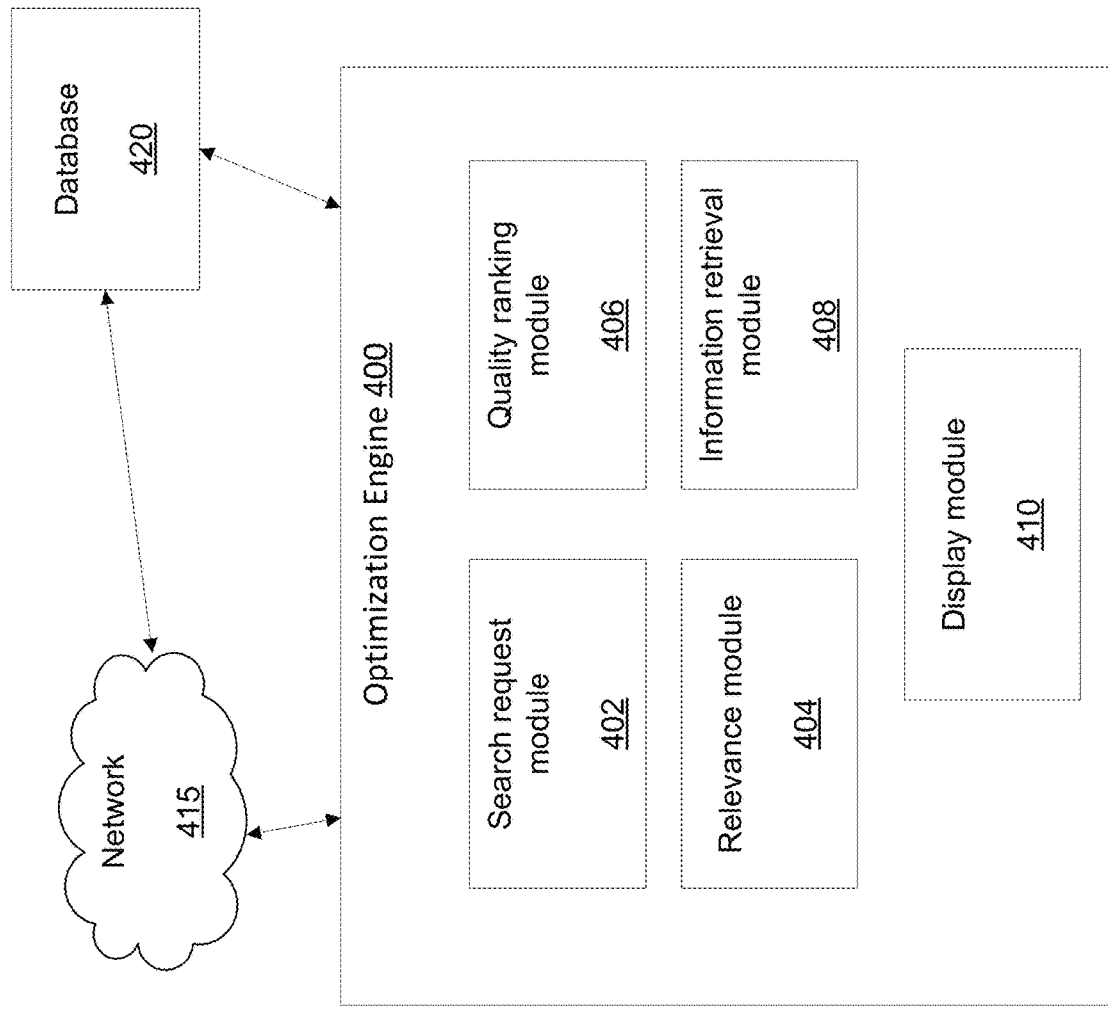
FIG. 4 is a schematic block diagram illustrating components of an exemplary system in accordance with embodiments of the present disclosure.

FIG. 4 is a block diagram illustrating the components for performing the systems and methods discussed herein. FIG. 4 includes an optimization engine 400, network 415 and database 420. The optimization engine 400 can be a special purpose machine or processor and could be hosted by an application server, content server, search server, social networking server, web server, content provider, email service provider, ad server, user's computing device, game server, and the like, or any combination thereof.

According to some embodiments, optimization engine 400 can be embodied as a stand-alone application that executes on a user device. In some embodiments, the optimization engine 400 can function as a downloadable application installed on the user's device, and in some embodiments, such application can be a web-based application accessed by the user device over a network. In some embodiments, the optimization engine 400 can be installed as an augmenting script, program or application to another application (e.g., Yahoo! Search®, Tumblr®, Flickr®, Facebook®, Twitter®, Netflix® or any other type of application that enables the searching and display of digital content, and the like).

The database 420 can be any type of database or memory, and can be associated with a content server on a network (e.g., content server 106, social networking server 120 or application server 108 from FIG. 1) or a user's device (e.g., device 101-104 or device 200 from FIGS. 1-2). Database 420 comprises a dataset of data and metadata associated with local and/or network information related to users, services, applications, content, and the like. Such information can be stored and indexed in the database 420 independently and/or as a linked or associated dataset. As discussed above, it should be understood that the data (and metadata) in the database 420 can be any type of information and type, whether known or to be known, without departing from the scope of the present disclosure.

According to some embodiments, database 420 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof.

In some embodiments, the user data can also include, for purposes providing, displaying, creating, streaming, recommending, rendering and/or delivering media, user device information, including, but not limited to, device identifying information, device capability information, device display attributes (e.g., screen size, resolution, version, and the like), voice/data carrier information, Internet Protocol (IP) address, applications installed or capable of being installed or executed on such device, and/or any, or some combination thereof.

It should be understood that the data (and metadata) in the database 420 can be any type of information related to a user, content, a device, an application, a service provider, a content provider, whether known or to be known, without departing from the scope of the present disclosure.

According to some embodiments, database 420 can store data and metadata associated with media content from an assortment of media and/or service providers and/or platforms. For example, the information can be related to, but not limited to, content type of the media file, a category associated with the media, information associated with the pixels and frames of the media, information associated with the provider or hosting entity of the media, and any other type of known or to be known attribute or feature associated with a media file. Additionally, the media information in database 420 for each media file can comprise, but is not limited to, attributes including, but not limited to, popularity of the media, quality of the media, recency of the media (when it was published, shared, edited and the like), and the like. Such factors can be derived from information provided by the user, a service provider (i.e., Yahoo!® or Tumblr®), by the content/service providers providing media content (e.g., Netflix®, Hulu®, YouTube®), or by other third party services (e.g., rottentomatoes.com, IMDB™, Facebook®, Twitter® and the like), or some combination thereof.

According to some embodiments, as such media information is received, generated and/or identified, it can be stored in database 420 as an n-dimensional vector (or feature vector) representation for each media, where the information associated with the media can be translated as a node on the n-dimensional vector. Database 420 can store and index media information in database 420 as linked set of media data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. While the storage discussion herein focuses on vector analysis, the stored information in database 420 can be analyzed, stored and indexed according to any known or to be known computational analysis technique or algorithm, such as, but not limited to, cluster analysis, data mining, Bayesian network analysis, Hidden Markov models, artificial neural network analysis, logical model and/or tree analysis, and the like. Additionally, the user data stored in database 420 can be stored in a similar manner.

For purposes of the present disclosure, information cards are discussed as comprising interactive digital content or media files (used interchangeably). While content and media files as a whole are discussed within some embodiments, it should not be construed to limit the applications of the systems and methods discussed herein. That is, while reference is made throughout the instant disclosure to content or media files, such files should be understood to include any type of internet provided and/or user generated content (UGC), including, but not limited to, images, video, text, audio, multimedia, RSS feeds, graphics interchange format (GIF) files, short-term videos (e.g., Vine® videos), hyperlinks, hyperlinked content, and the like, without departing from the scope of the instant application, which can thereby be identified, displayed and/or communicated and/or accessed and processed by the optimization engine 400 according to the systems and methods discussed herein.

As discussed above, with reference to FIG. 1, the network 415 can be any type of network such as, but not limited to, a wireless network, a local area network (LAN), wide area network (WAN), the Internet, or a combination thereof. The network 415 facilitates connectivity of the optimization engine 400, and the database of stored resources 420. Indeed, as illustrated in FIG. 4, the optimization engine 400 and database 420 can be directly connected by any known or to be known method of connecting and/or enabling communication between such devices and resources.

The principal processor, server, or combination of devices that comprises hardware programmed in accordance with the special purpose functions herein is referred to for convenience as optimization engine 400, and includes search request module 402, relevance module 404, quality ranking module 406, information retrieval (IR) module 408 and display module 410. It should be understood that the engine(s) and modules discussed herein are non-exhaustive, as additional or fewer engines and/or modules (or sub-modules) may be applicable to the embodiments of the disclosed systems and methods. The operations, configurations and functionalities of each module, and their role within embodiments of the present disclosure will be discussed with reference to FIGS. 5-6.

As discussed in more detail below, the information processed by the optimization engine 400 can be supplied to the database 420 in order to ensure that the information housed in the database 420 is up-to-date as the disclosed systems and methods leverage real-time information and/or behavior associated with the received streaming media feed, as discussed in more detail below.

Figure 5:
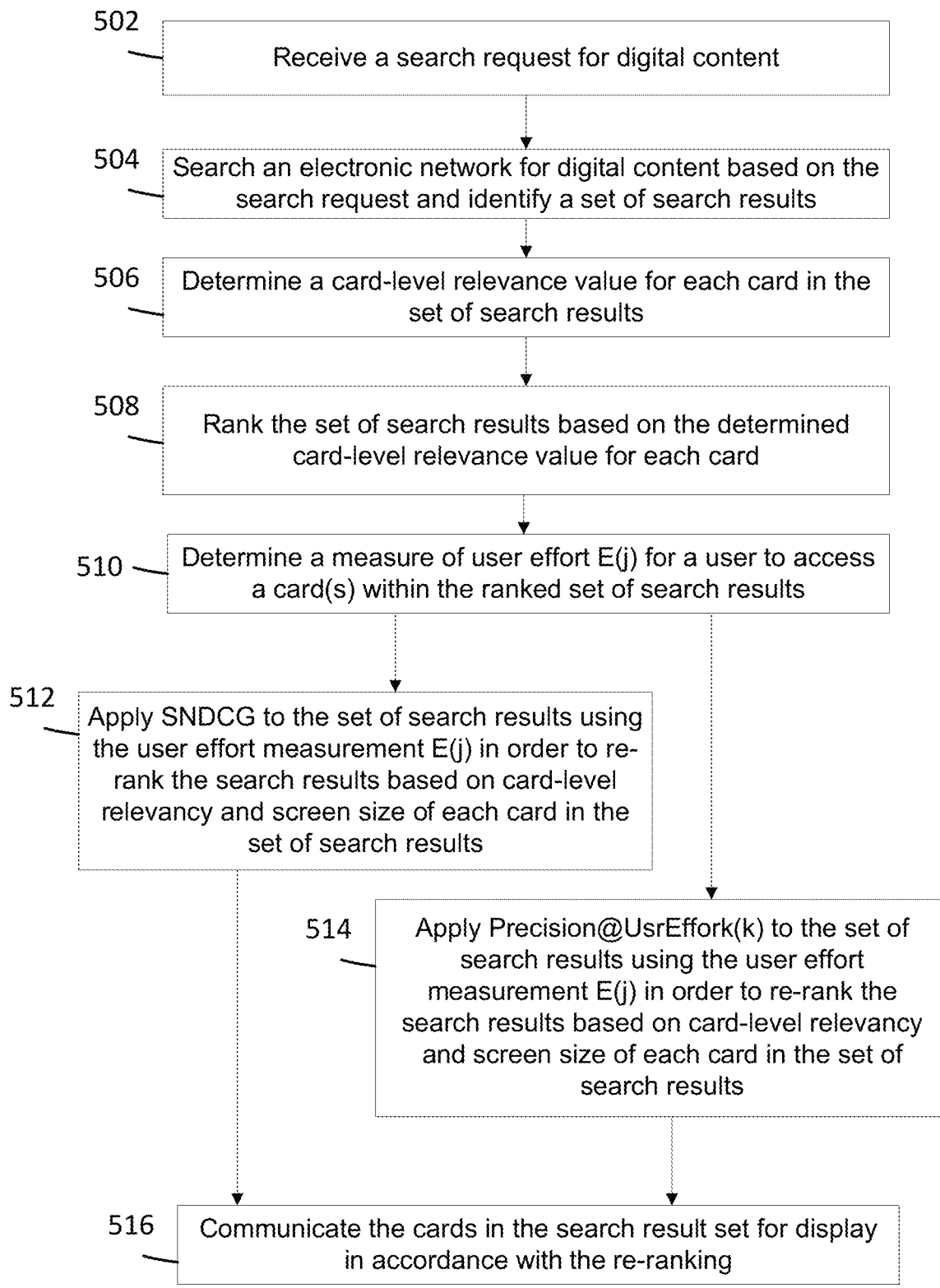
FIG. 5 is a flowchart illustrating steps performed in accordance with some embodiments of the present disclosure.

Turning to FIG. 5, Process 500 details some embodiments of search and recommendation systems automatically leveraging the display screen sizes of information cards when providing such cards as search results.

Process 500 begins with the reception of a search request from a user for content. Step 502. The form, type or manner of search request can take any known or to be known form. By way of a non-limiting example, a user can enter a search into a search engine, or a query can be automatically generated based on the user's location or the time of day. As discussed above, the search can be for any type of content and can correspond to any type of system where content is searched for and identified—for example, a search engine, recommendation system and the like. Step 502 is performed by the search request module 402.

In Step 504, a search for relevant digital content is performed based on the search request. Step 504 is performed by the search request module 402. As discussed above, and understood by those of skill in the art, the search can be across multiple domains, networks, databases, devices, and the like, or some combination thereof. For example, the search for content can span websites associated with particular types of content (e.g., news websites) and social networking websites (e.g., Facebook®, Twitter®, Tumblr®).

According to some embodiments, the search in Step 504 can be performed by any known or to be known computerized search technique, algorithm or methodology. For example, the search can be performed by parsing and analyzing an index (e.g., stored in database 420) of stored network resource information based on the information in the search query. In another non-limiting example, a data store of resources can be searched by translating the search query into an n-dimensional feature vector (as discussed above), and comparing the search vector against stored vectors of the network resources, as discussed above. The resources having vectors that are similar (to at least a threshold value) to the search vector can be identified.

Therefore, as a result of the search in Step 504, a set of search results is identified. According to some embodiments, the set of search results includes information cards formatted to include digital content from the search, as discussed above. The set of search results can include any number of cards and/or digital content objects within cards. For example, a card comprising content identified from CNN® can include 2 links to 2 news stories from the news website, while a card comprising content from Tumblr® can include only 1 digital image.

In Step 506, having identified a set of search results, the relevance module 404 determines the relevance of each card. According to embodiments of Process 500, a relevance score for each card, as a whole, is determined. Relevance scores for the particular content within the identified cards are determined in accordance with Process 600, discussed in more detail below.

The relevance score of each card in the set of search results can be referred to as "card-level relevance." The card-level relevance provides an indication as to the relevancy of the card to the search query. Thus, the card-level relevance determination of Step 506 can provide information indicating the ranking of the search results. For example, if a card's relevance score is greater in value than another card's score, then that card can be ranked higher than the other card.

According to some embodiments, the determination of the card-level relevance for each card in the set of search results can be based on any known or to be known relevance and/or ranking technique, technology, algorithm or methodology, including, but not limited to, mean average precision (MAP), Precision@(k), Recall@k, NDCG, NDCG@k, Mean Reciprocal Rank (MRR), or any other known or to be known learning to rank machine-learning (MLR) ranking technique, technology, algorithm or methodology, or some combination thereof. Such techniques, technologies, algorithms or methodologies can be embodied as software executing on a computing device or server, where the software defines such techniques, technologies, algorithms or methodologies and executes their inherent computer-implemented instructions upon running the software on the cards in the search result set.

According to some embodiments, the determination of the card-level relevance for each card in the set of search results can be based on human annotation or from user feedback extracted from user activity logs. Such user input can include, for example, but is not limited to, click and post-click dwell-time on a content object/item, popularity of the content, and/or applied human labels, and the like, as discussed above.

Based on the card-level relevance score of each card in the search result set, an initial ranking of the search result set is performed by the relevance module 404. Step 508. As discussed above, the ranking can be based on the card-level relevance ranking, where the cards with the higher scores are ranked higher than those with lower scores. In some embodiments, a comparison to a relevance threshold is performed where the cards having a card-level relevance value at or below the threshold are removed from the search result set.

In some embodiments, the relevance determination from Steps 506-508 may not be performed as the ranking of a set of search results can be based solely on how, where and/or when the cards where identified over the network. For example, cards identified from local news sources may be ranked higher than cards from remotely located sources.

Having an initial ranked set of search results based on the relevance of the cards, Process 500 turns to Step 510 where the quality ranking module 406 determines a measure of user effort for a user to access a card(s) within the ranked set of search results. User effort (also referred to interchangeably as "browsing effort") is a quantifiable measure of activity that must be performed (either by a user and/or by a computer) to reach a card when it is included in the set of displayed search results (e.g., where on the screen is the card displayed and what inputs must a user perform, or the computer perform, in order for the user to view and/or interact with such card). For example, if a card is located at position j on a ranked list, a user must scroll through cards 1 to j−1 in order to view the card.

Thus, the user effort equals:

$$E(j)=\operatorname{sum}\_k(S_{i,k}/\text{alpha})(k=1,\ldots,j-1), \quad (\text{Eq. 1})$$

where $S_{i,k}$ denotes the size of a card type $C_i$ at rank position k, the sum is over rank position 1 to j−1, and alpha is a predetermined constant (e.g., the screen size of a card, which normalizes the user effort).

As discussed herein, Process 500 has two routes it can follow. After Step 510, it can proceed to Step 512 then Step 516, or it can proceed to Step 514 then Step 516. The differences in Steps 512 and 514 are based on a differing algorithm, technique or technology being applied to the determined user effort from Step 510, as discussed in more detail below.

Turning to Step 512, having determined the quantifiable value of user effort for each card in the set of search results (as in Step 510), the optimization engine 400 executes the IR module 408 which applies SNDCG to the set of search results using the user effort measurement E(j) in order to re-rank the search results based on relevancy and screen-size of the cards in the search result set.

Step 512 involves extending DCG and NDCG by using the determined user effort measurement E(j) for each card from Step 510 above. In contrast to the original version of a DCG score of each item at rank position j: DCG(j)= (2^relevance_label(j)−1)/log(j+1), where log(j+1) is the user effort component, in Step 512, the IR module 408 determines a card screen size (SDCG(j)) for each card in the set of search results—referred to as advanced DCG or SDCG:

$$SDCG(j)=(2\hat{\;}\text{relevance\_label}(j)-1)/\log(E(j)+2), \quad (\text{Eq. 2}).$$

Thus, Step 512 involves computing the SDCG(j) for each card at rank j. Based on this computation, a total SDCG score can be determined by summing all SDCG(j) scores over all ranked positions j (e.g., from 1 to n). Step 512 then computes another ranking score, referred to as an "ideal SDCG score," by ranking each card at its top ranked position computed in Eq. 2 (which accounts for the screen size of each card). Here, not only is the relevance of each card considered, but also are the screen sizes of each card. According to some embodiments, this can involve analyzing each permutations of a card ranking and computing the SDCG scores for each ranked list, which are then summed to determine the total SDCG score.

By way of a non-limiting example, a search result set includes 4 cards—a mail card, web card, contacts card and calendar card. For purposes of this example, the top relevance score is 3 and the lowest is 0. The mail card has an alpha value of 2 (e.g., number of items in the card—for example, two mail items), and a relevance score of 3. The web search result card has an alpha value of 8 (e.g., 8 search results) and a relevance score of 3. The contacts card has an alpha value of 1 (e.g., 1 friend's contact), and a relevance score of 3. The calendar card has an alpha value of 1 (e.g., 1 appointment reminder) and a relevance score of 2. This information can be represented as follows:

S_mail/alpha=2, rel(mail)=3;
S_web/alpha=8, rel(web)=3;
S_contact/alpha=1, rel(contact)=3;
S_calendar/alpha=1, rel(calendar)=2.

The total SDCG of the rank list: mail@1, web@2, contact@3, calendar@4 is:
(2^3−1)/log(2)+(2^3−1)/log(2+2)+(2^3−1)/log(2+10+2)+(2^2−1)/log(2+8+1+2);

The total SDCG of the rank list: mail@1, contact@2, web@3, calendar@4 is:
(2^3−1)/log(2)+(2^3−1)/log(2+2)+(2^3−1)/log(2+1+2)+(2^2−1)/log(2+1+8+2);

The total SDCG of the rank list: contact@1, mail@2, web@3, calendar@4 is:
(2^3−1)/log(2)+(2^3−1)/log(1+2)+(2^3−1)/log(1+2+2)+(2^2−1)/log(1+2+8+2)=21.98;

The total SDCG of the rank list: contact@1, mail@2, calendar@3, web@4 is:
(2^3−1)/log(2)+(2^3−1)/log(1+2)+(2^2−1)/log(1+2+2)+(2^3−1)/log(1+2+1+2)=22.24.

Thus, the maximal ideal SDCG is achieved by the rank list:
contact@1, mail@2, calendar@3, web@4.

Such ranking shows that despite a card having a higher relevance than another card (e.g., the web card has a slightly higher relevance score (3) than the calendar card's relevance score (2)), accounting for a card's size can result in such card being ranked lower.

Continuing with Step 512, after computing the ideal SDCG score, the normalized SDCG (referred to as "NSDCG") for each rank list is computed:

$$NSDCG(\text{a rank list})=SDCG(\text{a rank list})/\text{ideal } SDCG(\text{a rank list}) \quad \text{(Eq. 3)}.$$

Therefore, utilizing the NSDCG scoring enables the determination of a new ranking that optimizes the screen size of the cards in the set of search results. According to some embodiments, for example, application of the NSDCG, as in Step 512, enables cards with high relevancy and less-screen-size to be pushed to the top of the search/recommendation results.

In step 516, the cards in the search result set are communicated to the requesting user for display on the device of the user in accordance with the re-ranking occurring in Step 512. Step 516 is performed by the display module 410. Thus, the cards in the search result set will be displayed in the order determined from Step 512, which accounts not only for the relevancy of the content of the cards but also for the display size of the cards (as illustrated in the example in FIG. 3B, discussed above).

Turning to Step 514, having determined the quantifiable value of user effort for each card in the set of search results (as in Step 510), the optimization engine 400 can execute the IR module 408 which applies Precision@UsrEffort(k) to the set of search results using the user effort measurement E(j) in order to re-rank the search results based on relevancy and screen-size of the cards in the search result set.

In contrast to the known version of Precision@k, where Precision@k=number of relevant items in top rank position 1 to k divided by k, Step 514 involves computing screen size (Precision@UsrEffort(k)) for each card as follows:

$$\text{Precision@UsrEffort}(k)=(\text{number of relevant cards a user can browse to from rank position 1 to rank position } j \text{ when user effort is at most UsrEffort}(k))/\text{number of cards below rank position } j), \quad \text{(Eq. 4)}$$

where UsrEffort(k) is a predetermined value, and j is computed by the minimal $E(j)=\text{sum}\_k(S_{i,k}/\text{alpha})(k=1, \ldots j-1) >= \text{UsrEffort}(k)$.

By way of example, assuming for example purposes only:
S_mail/alpha=2, rel(mail)=3;
S_web/alpha=8, rel(web)=3;
S_contact/alpha=1, rel(contact)=3;
S_calendar/alpha=1, rel(calendar)=0.

Utilizing the Precision@UsrEffort(k) algorithm, the re-ranking results in:
Precision@UsrEffort(9)=mail@1, web@2, contact@3, calendar@4.

Such re-ranking can be performed (as per Step 514) by the following steps:
E(1)=0, E(2)=10, E(3)=11, E(4)=12; therefore, by spending effort 10, users can reach j=2 since only E(2)>=9. Thus Precision@UsrEffort(9)=2/2=100%.

Precision@UsrEffort(11) is: j=3 since E(3)>=11. Thus, Precision@UsrEffort(11)=3/3=100%.

Precision@UsrEffort(12) is: j=4 since E(4)>=12. Thus, Precision@UsrEffort(12)=3/4=75%

According to some embodiments, similar to Precision@k, for different user browsing effort UsrEffort(k), which determines how deep the user will browse down into the rank list, different Precision@UsrEffort(k) can be computed for the same rank set of cards.

Utilizing the Precision@UsrEffort(k) scoring enables the determination of a new ranking that optimizes the screen size of the cards in the set of search results. In a similar manner as discussed above, in step 516, the cards in the search result set are communicated to the requesting user for display on the device of the user in accordance with the re-ranking occurring in Step 514. Thus, in accordance with embodiments involving Step 514, the cards in the search result set will be displayed in the order determined from Step 514, which accounts not only for the relevancy of the content of the cards but also for the display size of the cards (as illustrated in the example in FIG. 3B, discussed above).

According to some embodiments, having determined the ranking of cards from SNDCG or Precision@UsrEffort(k), they can be fed into MLR rankers or models for optimizing a card search. Thus, according to some embodiments of the present disclosure, information associated with and/or utilized during the search, identification, ranking and/or re-ranking of cards, as discussed above in relation to Process 500 of FIG. 5, can be fed back to the optimization engine 400 for modeling (or training) when performing a subsequent search for content via iterative or recursive bootstrapping or aggregation functionality. Embodiments of the present disclosure involve the optimization engine 400 applying such recursive/bootstrapping functions utilizing any known or to be known open source and/or commercial software machine learning algorithm, technique or technology.

According to some embodiments, where point-wise or pair-wise MLR rankers/models are being implemented, a predefined display-screen-size-based efficiency penalty for each card is to be set at the onset of Process 500 so that large-sized cards will receive a greater penalty score. This penalty score can be combined with the relevancy score for each card, which thereby could impact the card's rank.

Turning to FIG. 6, in contrast to Process 500 of FIG. 5 where relevance scores for whole cards are determined (i.e., card-level relevance), Process 600 involves embodiments where the relevance score for each content item or element (e.g., link) within each identified card is determined. Therefore, Steps 602-604 are similar to Steps 502-504 in Process 500 where a search request is received and a search is performed. In Step 606, a relevance score for each card is determined, in a similar manner to Step 506 of Process 500. However, instead of determining a card-level relevance score, a relevance score for each card is determined based on the relevancy of each item in card, referred to as a "link-level relevance" score or value.

According to some embodiments, the determination of the link-level relevance for each item in a card in the set of search results can be based on parsing the cards and performing a MLR technique on the parsed content. Such MLR technique can include any known or to be known relevance and/or ranking technique, technology, algorithm or methodology, including, but not limited to, mean average precision (MAP), Precision@(k), Recall@k, NDCG, NDCG@k, Mean Reciprocal Rank (MRR), or some combination thereof. Such techniques, technologies, algorithms or methodologies can be embodied as software executing on a computing device or server, where the software defines such techniques, technologies, algorithms or methodologies and executes their inherent computer-implemented instructions upon running the software on the cards in the search result set. According to some embodiments, the determination of the link-level relevance for each card in the set of search results can be based on human annotation or from user feedback extracted from user activity logs.

For example, an email card is identified in the search result. The card contains 5 emails, and as a result, the card can contain 5 link-level relevant scores—one for each email in the card.

Having determined the link-level relevance ranking for each card in the result set, Process 600 continues to Step 608 through Step 616 in a similar manner as discussed above in relation to Steps 508-516. The difference in Process 600 is that instead of the ranking and user effort determinations being based upon card-level relevance, the ranking and user effort are in accordance with link-level relevance for each card. Therefore, Process 600 enables the determination of a user effort measurement for each result item (or link) in a card by using the relative rank position within each card.

For example, from an email card's starting position, the user effort of reaching the 3rd email in the email card consisting of 5 emails can be computed by $S\_i/alpha*2/5$, where $S\_i$ is the card's display screen size.

After computing the user browsing effort for each result link (within each card—Step 610) Process proceeds to Steps 612 or 614 in order to determine ranking of the cards based on the size of the cards and the relevance ranking (at the link level)—which is performed and computed in a similar manner as discussed above in relation to Steps 512-514. After such computation of a re-ranked list, Step 616 involves the cards in the search result set being communicated to the requesting user for display on the device of the user in accordance with the re-ranking occurring in Step 612 or Step 614, as above in Step 516.

By way of a non-limiting example, if a web card contains 10 results while only the 8th result is relevant, users need to spend significant more effort to reach it than in a situation where the 1st result is relevant. Therefore, considering the difference of the within-card user effort (which is based on link-level relevance) results in an improved ranking and optimization when providing cards as search results, as performed in Process 600.

As illustrated in the results of Processes 500 and 600, by considering the display screen sizes of different card types to better measure user effort/search efficiency, the disclosed systems and methods can properly measure ranking performance of a card-based search and recommendation system, where different cards with varied display screen sizes are blended into one ranking list to be shown to the users. At the same time, the disclosed systems and methods can be directly/flexibly used to design better ranking optimization targets by extending all available standard optimization targets by replacing the rank position information in those targets with the card-screen-size based approach described herein (e.g., Processes 500 and 600), such that using the disclosed approaches can train MLR models to achieve better user satisfaction. In some embodiments, the approaches disclosed in Processes 500 and 600 can be useful for handling MLR recommendations or searches on mobile devices, where results are organized into informational cards that have varied sizes and displayed on screens of varied sizes.

FIG. 7 is a work flow example 700 for serving relevant digital content comprising advertisements (e.g., advertisement content) based on the information associated with searching for, communicating and/or displaying search results (e.g., identified and displayed information cards of content), as discussed above. Such information, referred to as "search information" for reference purposes only, can include, but is not limited to, the identity of the content within a displayed card(s), the attributes of the search terms used in identifying the content, attributes of the user(s) receiving the display, and the like, and/or some combination thereof.

As discussed herein, reference to an "advertisement" should be understood to include, but not be limited to, digital content that provides information provided by another user, service, third party, entity, and the like. Such digital ad content can include any type of media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. In some embodiments, the digital advertisement identified and displayed in FIG. 7 can take the form of an information card, as discussed above.

By way of a non-limiting example, work flow 700 includes a user searching for images from a professional baseball game. Based on information related to the determination and display of cards of content baseball content, for example, the user may be provided with digital ad content related to the purchase of tickets to an upcoming game. This ad content can be included in a generated or identified information card.

In Step 702, information associated with a search for digital content or search result is identified. As discussed above, the search information can be based on the information utilized and/or output from processes 500-600, as outlined above with respect to FIGS. 5-6. For purposes of this disclosure, Process 700 will refer to single search result as the basis for serving an advertisement(s); however, it should not be construed as limiting, as any number of information cards or results, and/or quantities of information related to users and their interaction with the information cards can form such basis, without departing from the scope of the instant disclosure.

In Step 704, a context is determined based on the identified search information. This context forms a basis for serving advertisements related to the search information. In some embodiments, the context can be determined by determining a category which the search information of Step 702 represents. For example, the category can be related to the type of media provided within an identified and/or displayed information card. In some embodiments, the identification of the context from Step 704 can occur before, during and/or after the analysis detailed above with respect to Processes 500-600, or some combination thereof.

In Step 706, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 708, the advertisement server 130 searches the ad database for an advertisement(s) that matches the identified context. In Step 710, an advertisement is selected (or retrieved) based on the results of Step 708. In some embodiments, the selected advertisement can be modified to conform to attributes of the screen, page, message or method upon which the advertisement will be displayed, and/or to the application and/or device for which it will be displayed. Such modification can be performed in a similar manner as discussed above in relation to FIGS. 5-6. In some embodiments, the selected advertisement is shared or communicated via the application the user is utilizing to view the search result. Step 712. In some embodiments, the selected advertisement is sent directly to each user's computing device. In some embodiments, the selected advertisement is displayed in conjunction with a rendered information card (e.g., the rendered and displayed media files of the card) on the user's device and/or within the application being used to identify, select and/or render the content/media. In some embodiments, the digital ad file can be inserted into the ordered/ranked display of cards on a user's device.

As shown in FIG. 8, internal architecture 800 of a computing device(s), computing system, computing platform, user devices, set-top box, smart TV and the like includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), media disk drive interface 820 as an interface for a drive that can read and/or write to media including removable media such as floppy, CD-ROM, DVD, media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces and a universal serial bus (USB) interface.

Memory 804 interfaces with computer bus 802 so as to provide information stored in memory 804 to CPU 812 during execution of software programs such as an operating system, application programs, device drivers, and software modules that comprise program code, and/or computer executable process steps, incorporating functionality described herein, e.g., one or more of process flows described herein. CPU 812 first loads computer executable process steps from storage, e.g., memory 804, computer readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 828 typically provides information communication using transmission media through one or more networks to other devices that use or process the information. For example, network link 828 may provide a connection through local network 824 to a host computer 826 or to equipment operated by a Network or Internet Service Provider (ISP) 830. ISP equipment in turn provides data communication services through the public, worldwide packet-switching communication network of networks now commonly referred to as the Internet 832.

A computer called a server host 834 connected to the Internet 832 hosts a process that provides a service in response to information received over the Internet 832. For example, server host 834 hosts a process that provides information representing video data for presentation at display 810. It is contemplated that the components of system 800 can be deployed in various configurations within other computer systems, e.g., host and server.

At least some embodiments of the present disclosure are related to the use of computer system 800 for implementing some or all of the techniques described herein. According to one embodiment, those techniques are performed by computer system 800 in response to processing unit 812 executing one or more sequences of one or more processor instructions contained in memory 804. Such instructions, also called computer instructions, software and program code, may be read into memory 804 from another computer-readable medium 806 such as storage device or network link. Execution of the sequences of instructions contained in memory 804 causes processing unit 812 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 800. Computer system 800 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 802 as it is received, or may be stored in memory 804 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising steps of:
   receiving, at a computing device, a request for content that is to be communicated to a user for display on a device of the user;
   searching, via the computing device, a database of network resources for said content, said search comprising analyzing said network resources and compiling a set of search results, said search result set comprising an information card for each result in the set, said information cards comprising digital content associated with at least one network resource;
   analyzing, via the computing device, the digital content of each information card, said analysis comprising determining a relevance score of the content of each card respective to the received request, and based on said relevance score for each card, ranking the search result set;
   determining, via the computing device, a user effort value for each card in the ranked result set, said determination comprising analyzing each card's position in the ranked result set and determining said user effort value at said position, said user effort providing an indication of the activity that must be performed in order to interact with a card when it is displayed at a position;
   determining, via the computing device, said display size of each card in said ranked set, said display size determination comprising computing a summation score for each card based on each card's relevance score and user effort value, said display size for each card is based on said summation score for each card, said display size providing an indication as to a screen size said card will occupy when displayed;
   re-ranking, via the computing device, said ranked result set, said re-ranking comprising determining a maximal ideal score for each card based on each card's summation score, said re-ranking is based on said determined ideal scores; and
   communicating, via the computing device, said re-ranked result set to said user for display on said user device, said communication causing said cards in the re-ranked result set to be displayed on said user device according to said re-ranking.

2. The method of claim 1, wherein said relevance score determination further comprises:
   analyzing digital content of each card and determining a relevance of said content to said received request, said analysis comprising comparing said digital content to said requested content and determining said relevance score,
   wherein said determined relevance score is a card-level relevance score, said card-level relevance score providing an indication as to the relevance of each card as a whole to the received request.

3. The method of claim 2, wherein said analysis and comparison of the digital content includes the computing device executing software defining a learning-to-rank machine-learning (MLR) ranking technique selected from a group consisting of: mean average precision (MAP), Precision@(k), Recall@k, NDCG, NDCG@k and Mean Reciprocal Rank (MRR).

4. The method of claim 1, wherein said relevance score determination further comprises:
   analyzing digital content of each card and determining a relevance of said content to said received request, said analysis comprising parsing said digital content in each card in order to identify each content object in each card, and comparing, for each card, each content object to said requested content and determining said relevance score for each card,
   wherein said determined relevance score is a link-level relevance score, said link-level relevance score providing an indication as to the relevance of individual content included in the digital content of each card.

5. The method of claim 4, wherein said analysis and comparison of the digital content includes the computing device executing software defining a learning-to-rank machine-learning (MLR) ranking technique selected from a group consisting of: mean average precision (MAP), Precision@(k), Recall@k, NDCG, NDCG@k and Mean Reciprocal Rank (MRR).

6. The method of claim 1, wherein said user effort, E(j), determination comprises performing:

$$E(j)=\text{sum}\_k(S_{i,k}/\text{alpha})(k=1,\ldots,j-1),$$

wherein, $S_{i,k}$ denotes the size of a card type $C_i$ at rank position k,
wherein the sum is over rank position 1 to j−1, and
wherein alpha is a predetermined constant.

7. The method of claim 1, wherein each information card comprises interactive digital content having associated therewith hyperlinked content actionable when interacted with.

8. The method of claim 1, wherein said re-ranking further comprises:
   determining the display size of each card by performing:

Precision@UsrEffort(k)=(number of relevant cards a user can browse to from rank position 1 to rank position j when user effort is at most UsrEffort (k))/number of cards below rank position j), wherein UsrEffort(k) is a predetermined value,
wherein j is computed by the minimal user effort $E(j)=\text{sum}\_k(S_{i,k}/\text{alpha})(k=1,\ldots j-1) \geq \text{UsrEffort}(k)$; and
determining said re-ranked result set based on Precision@UsrEffort(k).

9. The method of claim 1, wherein said communication of the re-ranked result set causes said cards in said set to be displayed in a formation comprising an orientation selected from a group consisting of: horizontal, vertical, horizontal and vertical, rotational, and a combination thereof, wherein said formation is based upon said re-ranking.

10. The method of claim 1, further comprising:
determining a context of the digital content in the cards of the communicated set;
causing communication, over the network, of said context to an advertisement platform to obtain digital advertisement content associated with said context; and
communicating another card comprising said identified digital advertisement content with said communicated result set.

11. A non-transitory computer-readable storage medium tangibly encoded with computer-executable instructions, that when executed by a processor associated with a social networking server, performs a method comprising:
receiving a request for content that is to be communicated to a user for display on a device of the user;
searching a database of network resources for said content, said search comprising analyzing said network resources and compiling a set of search results, said search result set comprising an information card for each result in the set, said information cards comprising digital content associated with at least one network resource;
analyzing the digital content of each information card, said analysis comprising determining a relevance score of the content of each card respective to the received request, and based on said relevance score for each card, ranking the search result set;
determining a user effort value for each card in the ranked result set, said determination comprising analyzing each card's position in the ranked result set and determining said user effort value at said position, said user effort providing an indication of the activity that must be performed in order to interact with a card when it is displayed at a position;
determining said display size of each card in said ranked set, said display size determination comprising computing a summation score for each card based on each card's relevance score and user effort value, said display size for each card is based on said summation score for each card, said display size providing an indication as to a screen size said card will occupy when displayed;
re-ranking said ranked result set, said re-ranking comprising determining a maximal ideal score for each card based on each card's summation score, said re-ranking is based on said determined ideal scores; and
communicating said re-ranked result set to said user for display on said user device, said communication causing said cards in the re-ranked result set to be displayed on said user device according to said re-ranking.

12. The non-transitory computer-readable storage medium of claim 11, wherein said relevance score determination further comprises:
analyzing digital content of each card and determining a relevance of said content to said received request, said analysis comprising comparing said digital content to said requested content and determining said relevance score,
wherein said determined relevance score is a card-level relevance score, said card-level relevance score providing an indication as to the relevance of each card as a whole to the received request.

13. The non-transitory computer-readable storage medium of claim 11, wherein said relevance score determination comprises the computing device executing software defining a learning-to-rank machine-learning (MLR) ranking technique selected from a group consisting of: mean average precision (MAP), Precision@(k), Recall@k, NDCG, NDCG@k and Mean Reciprocal Rank (MRR).

14. The non-transitory computer-readable storage medium of claim 11, wherein said relevance score determination further comprises:
analyzing digital content of each card and determining a relevance of said content to said received request, said analysis comprising parsing said digital content in each card in order to identify each content object in each card, and comparing, for each card, each content object to said requested content and determining said relevance score for each card,
wherein said determined relevance score is a link-level relevance score, said link-level relevance score providing an indication as to the relevance of individual content included in the digital content of each card.

15. The non-transitory computer-readable storage medium of claim 11, wherein said user effort, E(j), determination comprises performing:

$$E(j)=\text{sum}\_k(S_{i,k}/\text{alpha})(k=1,\ldots,j-1),$$

wherein, $S_{i,k}$ denotes the size of a card type $C_i$ at rank position k,
wherein the sum is over rank position 1 to j−1, and
wherein alpha is a predetermined constant.

16. The non-transitory computer-readable storage medium of claim 11, wherein each information card comprises interactive digital content having associated therewith hyperlinked content actionable when interacted with.

17. The non-transitory computer-readable storage medium of claim 11, wherein said re-ranking further comprises:
determining the display size of each card by performing:

Precision@UsrEffort(k)=(number of relevant cards a user can browse to from rank position 1 to rank position j when user effort is at most UsrEffort (k))/number of cards below rank position j), wherein UsrEffort(k) is a predetermined value,
wherein j is computed by the minimal user effort $E(j)=\text{sum}\_k(S_{i,k}/\text{alpha})(k=1,\ldots j-1) \geq \text{UsrEffort}(k)$; and
determining said re-ranked result set based on Precision@UsrEffort(k).

18. A computing device comprising:
a processor; and
a non-transitory computer-readable storage medium for tangibly storing thereon program logic for execution by the processor, the program logic comprising:
logic executed by the processor for receiving a request for content that is to be communicated to a user for display on a device of the user;
logic executed by the processor for searching a database of network resources for said content, said search comprising analyzing said network resources and compiling a set of search results, said search result set comprising an information card for each result in the set, said information cards comprising digital content associated with at least one network resource;

logic executed by the processor for analyzing the digital content of each information card, said analysis comprising determining a relevance score of the content of each card respective to the received request, and based on said relevance score for each card, ranking the search result set;

logic executed by the processor for determining a user effort value for each card in the ranked result set, said determination comprising analyzing each card's position in the ranked result set and determining said user effort value at said position, said user effort providing an indication of the activity that must be performed in order to interact with a card when it is displayed at a position;

logic executed by the processor for determining said display size of each card in said ranked set, said display size determination comprising computing a summation score for each card based on each card's relevance score and user effort value, said display size for each card is based on said summation score for each card, said display size providing an indication as to a screen size said card will occupy when displayed;

logic executed by the processor for re-ranking said ranked result set, said re-ranking comprising determining a maximal ideal score for each card based on each card's summation score, said re-ranking is based on said determined ideal scores; and logic executed by the processor for communicating said re-ranked result set to said user for display on said user device, said communication causing said cards in the re-ranked result set to be displayed on said user device according to said re-ranking.

* * * * *